United States Patent
Zucker et al.

[15] 3,682,447
[45] Aug. 8, 1972

[54] APPARATUS FOR PRODUCING DISPERSIONS OR SOLUTIONS FROM A LIQUID COMPONENT AND A SOLID OR PASTY COMPONENT

[72] Inventors: Friedrich Josef Zucker, Mülheim/Ruhr-Speldorf; Hans-Dieter Bruchmann, Cologne-Deutz, both of Germany

[73] Assignee: Deutsche Supraton Bruchmann & Zucker KG, Dusseldorf, Germany

[22] Filed: Oct. 12, 1970

[21] Appl. No.: 80,022

[52] U.S. Cl. ............................ 259/26, 259/DIG. 30
[51] Int. Cl. ................................................ B01f 7/08
[58] Field of Search........259/105, 6, 41, 178, 21, 25, 259/26, 9, 10, 45, 46, 64

[56] References Cited

UNITED STATES PATENTS

| | | |
|---|---|---|
| 2,254,042 | 8/1941 | Lihotzky.....................259/25 |
| 1,370,764 | 3/1921 | Popkess..................259/178 R |
| 3,102,694 | 9/1963 | Frenkel..........................259/6 |
| 2,982,990 | 5/1961 | Zomlefer......................259/6 |

*Primary Examiner*—Robert W. Jenkins
*Attorney*—Markva & Smith

[57] ABSTRACT

A mixing apparatus for producing dispersions or solutions from a liquid component and a solid or pasty component. The apparatus is designed especially for powdery materials, which have a tendency to agglomerate on contact with liquids. The solid or pasty components are supplied by a worm conveyor terminating directly in front of the rotor of the mixer, and the liquid component flows through the tubular core of the worm conveyor to the rotor. The two components are mixed as they are impelled radially between the rotor and a stationary surface.

25 Claims, 2 Drawing Figures

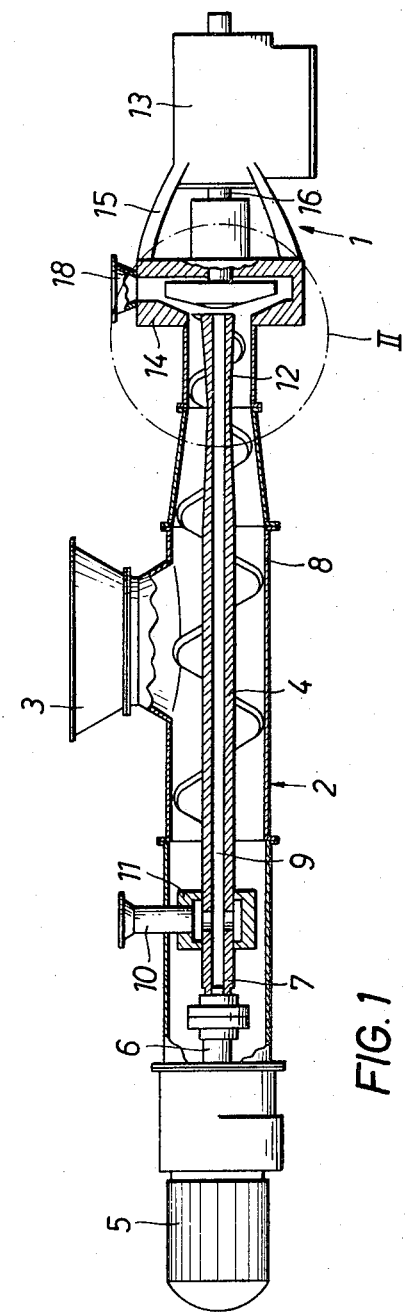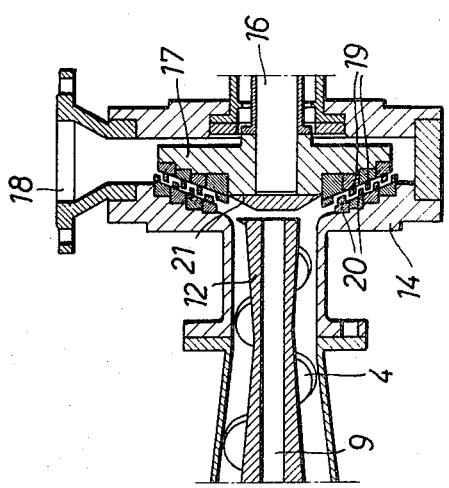

APPARATUS FOR PRODUCING DISPERSIONS OR SOLUTIONS FROM A LIQUID COMPONENT AND A SOLID OR PASTY COMPONENT

This invention relates to a mixing apparatus for producing dispersions or solutions from a liquid component and a solid or pasty component.

Known dissolving and dispersing apparatuses, in which the liquid and solid or pastry components are introduced separately, have the disadvantage that, there frequently occurs in the resultant dispersion or solution lumps or agglomerations which can subsequently be dissolved or dispersed only with difficulty. In practice, such lumps occur, for example, when the following products are being processed:

Potato starch, wheat starch, maize starch, bread grain flour, granulates of synthetic rubber, and powdery raw materials for synthetic fibers, such as polyacrylonitrile.

In these and many other substances agglomerations form when the solid substances come into contact with the dispersing liquid or with the solvent when a solution is being produced. The dispersion liquid or solvent cannot penetrate the agglomerations because of the surface swelling, since the swollen layer forms a liquid-tight covering. This phenomenon leads to the presence in the resulting solution or dispersion, of so-called knots, dots or lumps in which the two components are not present in uniform distribution and in their composition are not therefore in conformity with the average ratio of solid matter to dispersing agent or solid matter to solvent.

When such dispersions or solutions are further processed, the knots or dots often cause serious problems. In the production of coatings for the paper industry, such dots cause irregularities in the paper surface, for example after the coating has been applied to the paper.

The manufacture of synthetic fibers is another example. In this case the formation of knots in the raw material presents problems in that the spinning-nozzles become blocked. It is therefore necessary to mount expensive filters upstream of the spinning-nozzles and to renew these filters frequently in order to remove the knots washed against the filter. This entails losses of material as well as of time.

The described characteristic of various materials, of which only a few have been mentioned above, of forming agglomerations with the solvent or dispersing agent often makes it impossible to use continuous processes in further processing, as the machines used in this case, such, for example as mixing worms, become blocked or fouled after a short time operating. One common practice is to incorporate in the apparatus stirring containers in which the solution or dispersion is produced in batches, the solid matter to be dispersed being mixed with the liquid. Furthermore, stirring must in most cases be effected over a considerable period of time.

The object of the present invention is to provide apparatus by means of which even powdery materials, which have a tendency to agglomerate on contact with liquids can easily be dissolved or dispersed. This object is accomplished according to the invention by feeding the solid or pasty components by a conveyor terminating directly in front of the rotor of a mixer, and the liquid component through a supply pipe also terminating in front of the rotor so that both components arrive at the rotor separately and simultaneously.

This makes possible the continuous production of solutions or dispersions even from materials in which lumps form easily when combined with liquids. The apparatus according to the invention can be used to great advantage, for example in operations in the chemical, foodstuffs and synthetic fiber industries.

Care must be taken that the first contact between solid matter and solvent or dispersing agent takes place immediately on their entry into the mixing mechanism, so that the formation of agglomerations is positively made impossible. The process conditions are so selected that the formation of agglomerations is impossible because of the smallness of the contact space.

In a preferred embodiment of the invention, the supply pipe is a tubular core extending axially through a worm of a conveyor. The stream of liquid therefore necessarily issues out of the end of the conveyor worm it can thus be directed against the axis portion of the rotor of the mixer. The first contact between the two components takes place directly at the end of the worm, where the two components are acted on by the vanes or teeth of the mixer, so that neither sufficient time nor sufficient space is available for agglomeration of the solid or pasty material.

In an advantageous design according to the invention, the worm of the conveyor has multiple spiral turns in order to ensure a uniform supply of material. Further, in order to compress the solid or pasty material, for purposes of densifying and evacuation of air, it may have a core which is of progressively decreased cross-section in the conveying direction and/or the spiral turns may be of progressively decreasing pitch in the conveying direction.

An embodiment of the invention will now be described, by way of example, with reference to the accompanying drawing, in which:

FIG. 1 is a diagram partly in cross section of a dispersing apparatus; and

FIG. 2 shows, on an enlarged scale, the detail II of FIG. 1.

The dispersing device consists of a mixer 1 in front of which a conveyor 2 is located. The solid or pasty component, which may also be made available in the form of a granulate, is introduced into a supply hopper 3 and is carried to the mixer 1 by a worm 4 of the conveyor. The worm is driven by a driving motor 5 whose output shaft 6 is flanged directly on to the core 7 of the worm 4.

The worm 4 is disposed within a tube 8 which is tapered to a smaller diameter towards the mixer 1. The diameter of the spiral ridge of the worm is adapted to the cross section of the tube and thus likewise decreases in the conveying direction. The worm core 7 is provided with a longitudinal bore 9 through which the liquid component is fed to the end of the worm. The liquid is fed in at the rotary inlet 10 which is provided with a packing 11 tightly sealing at the worm core.

In order to compress the solid matter carried in the conveyor before it enters the dispersion zone, so that any air or gases contained there will escape, the external diameter of the core 7 increases progressively in the conveying direction, of section 12 at the end of the worm. The solid component is therefore compressed during passage through the conveyor. This effect is assisted by the aforementioned taper of the tube 8.

The motor of the mixer 1 is denoted 13. The mixer housing 14 is secured to the motor casing by projecting arms 15, while a shaft 16 drives a rotor 17. The housing forms a substantially closed annular space while is open only at the end of worm 4 and at the outlet opening 18. The rotor shaft 16 is sealed off from the annular space in order to prevent the escape of liquid.

The rotor 17 is in the shape of a truncated cone having coaxial rings 19 with stepped diameters secured to its outer surface; said rings defining slits with similar rings 20 fixed to the opposite inner conical wall of the housing 14. The rings 19 and 20 create in the radial direction a meandering path for the substances passing through the mixer. As the rotor 17 moreover rotates about the axis 16, the result is highly efficient intermixing.

The tubular core of the worm 4 terminates directly in front of the deflecting plate 21 mounted on the truncated cone of the rotor 17, the deflecting plate deflecting in the radial direction the liquid flowing through the bore 9 of the tubular core.

The following is detailed description of the dispersion or dissolving process. The dry product is fed into the supply hopper 3 and is carried by the worm 4 up to the entry zone of the rotor 14 of the mixer 1. The liquid required for the dissolving or dispersing process is supplied by feeding it under pressure into the rotary inlet 10 so that is passes into the bore 8 and is dispensed in front of deflecting plate 21 of the rotor 17. As a result of the rotation of the rotor 17, the liquid is dispersed as it is dispensed so that it is impelled in the form of a radiated film of liquid which is coaxially interposed with the solid matter continuously supplied by the conveyor. Thus continuous intimate mixing of the two components is effected in the annular space enclosed by the housing 14, the rotor 17 and the end of the worm.

Because of the spatially-limited zone in which the mixing takes place, and because of the high shearing forces arising in this zone which are generated by the high rotor speed of about 3,000 to 6,000 r.p.m., the formation of agglomerations is prevented. A further dispersion which is as fine as possible or a further solution of the solid matter is effected between the toothed rings 19 and 20 of the mixer.

Numerous modifications may be effected in the embodiment described. For example, spiral ridge of conveyor worm 4 can be designed with a pitch which progressively decreases in the conveying direction in order to increase the aforementioned compression effect. Moreover, a multiple-turn conveyor worm may be provided in order to supply the solid component as uniformly as possible into the annular space formed by the shaft end and the rotor. Within the scope of the invention, it is also not absolutely essential to supply the liquid component through the shaft core; it is only important, rather, to take care that the two components are brought together for the first time in front of the direct sphere of influence of the mixing elements 19 and 20.

Having thus set forth and disclosed the nature of this invention, what is claimed is:

1. Apparatus for producing dispersions and solutions by mixing together a liquid component and a solid or pasty component comprising a. rotary mixing means comprising a rotor and a housing for said rotor, said rotor having a truncated cone surface and said housing including a conical wall confronting and spaced from the truncated cone surface of said rotor, the truncated cone surface of said rotor and the conical wall of said housing including coaxial annular embossed rings between which said dispersion or solution passes generally radially during mixing, and b. means for feeding said liquid component and said solid or pasty component separately towards and into contact with said rotary mixing means and between said truncated cone surface and conical wall c. whereby said liquid component and said solid or pasty component are mixed together by said rotary mixing means.

2. Apparatus as claimed in claim 1 wherein said feeding means comprises a tubular housing containing a rotatably driven worm having a spiral ridge for feeding said solid or pasty component towards said rotor and conduit means for feeding said liquid component towards said rotor, one end of both said worm and said conduit means terminating adjacent said rotor.

3. Apparatus as claimed in claim 2 wherein said conduit means comprises a tubular core in said worm.

4. Apparatus as claimed in claim 1 wherein the annular embossed rings of said rotor and the annular embossed rings of the stationary conical wall of said housing extend alternately between each other whereby said dispersion or solution passes along a tortuous path.

5. In apparatus for producing dispersions and solutions by mixing together a liquid component and a solid or pasty component, a. a rotatably driven rotor means having a working surface, b. a stationary means having a working surface confronting and spaced from the working surface of said rotor means, c. at least one of said working surfaces comprising coaxial annular embossed rings, and d. means for simultaneously feeding a liquid component and a solid or pasty component to the axis of the working surface of said rotor means, e. whereby said liquid component and solid or pasty component are impelled generally radially along a tortuous path between said working surfaces and are mixed thereby.

6. Apparatus as claimed in claim 5 wherein both said working surfaces comprise coaxial annular embossed rings, said rings of said rotor surface and of said stationary surface extending alternatively between each other.

7. Apparatus as claimed in claim 5 wherein the working surfaces of said stationary means and said rotor means are conical in shape.

8. Apparatus for producing dispersions and solutions by mixing together a liquid component and a solid or pasty component comprising a. rotary mixing means and b. means for feeding said liquid component and said solid or pasty component separately towards and into contact with said rotary mixing means, said feeding means comprising a tubular housing containing a rotatably driven worm having a spiral ridge for feeding said solid or pasty component towards said rotor and a tubular conduit in said worm for feeding said liquid component towards said rotor, one end of said worm including said tubular conduit terminating adjacent said rotor, c. whereby said liquid component and said solid or pasty component are mixed together by said rotary mixing means.

9. Apparatus as claimed in claim 8 wherein said rotary mixing means comprises a rotor and a housing for said rotor, said rotor having a truncated cone surface and said housing including a conical wall confronting and spaced from the truncated cone surface of said rotor, said feeding means directing said liquid component and said solid or pasty component between said truncated cone surface and conical wall.

10. Apparatus as claimed in claim 9 wherein the truncated cone surface of said rotor and the conical wall of said housing include coaxial annular embossed rings between which said dispersion or solution passes generally radially during mixing.

11. Apparatus as claimed in claim 8 wherein a longitudinal section of said tubular housing has a diameter less than the portion of said tubular housing upstream therefrom whereby said solid or pasty component is compressed and densified during feeding towards said rotor.

12. Apparatus as claimed in claim 8 wherein the external surface of a section of the tubular bore of said worm conveyor has a diameter greater than the portion of said tubular bore upstream therefrom whereby said solid or pasty component is compressed and densified during feeding towards said rotor.

13. Apparatus as claimed in claim 8 wherein the radial distance between the external surface of said tubular bore and the internal surface of said tubular housing in a section of said feeding means is less than the radial distance in the portion of said feeding means upstream therefrom, whereby said solid or pasty component is compressed and densified during feeding towards said rotor.

14. Apparatus as claimed in claim 8 wherein the pitch of a section of the spiral ridge of said worm is smaller than the pitch of the spiral ridge upstream therefrom whereby said solid or pasty component is compressed and densified during feeding towards said rotor.

15. Apparatus as claimed in claim 8 further comprising a supply hopper communicating with said tubular housing to supply said solid or pasty component to said feeding means.

16. Apparatus as claimed in claim 8 further comprising an inlet communicating with said tubular core to supply said liquid component to said feeding means.

17. Apparatus for producing dispersions and solutions by mixing together a liquid component and a solid or pasty component comprising a. a rotatably driven rotor including a working surface passing through and radiating from the axis of said rotor, b. means for continuously feeding a liquid component into contact with said rotating working surface substantially at said axis whereby the liquid is dispersed and impelled in the form of a radiating film by said rotating working surface, and c. means for continuously feeding said solid or pasty component into said radiating film at at least one location spaced from said axis, d. whereby said liquid component and said solid or pasty component are continuously mixed together without the formation of lumps.

18. Apparatus as claimed in claim 17 wherein said means for feeding said solid or pasty component is arranged to feed said component in annular form into said radiating film of liquid about said axis.

19. Apparatus as claimed in claim 18 wherein said means for feeding said liquid component is adapted to feed said liquid component along a path within the annular form of said solid or pasty component towards the axis of said rotating working surface.

20. Apparatus as claimed in claim 19 wherein said means for feeding said solid or pasty component comprises a tubular housing containing a rotatably driven worm having a spiral ridge for feeding said solid or pasty component towards said rotor and said means for feeding said liquid component comprises a tubular conduit in said worm, one end of both said worm and said tubular conduit terminating adjacent said rotor.

21. Apparatus as claimed in claim 20 further comprising an inlet means communicating with said tubular core intermediate the opposite ends of said worm for supplying said liquid component to said feeding means.

22. Apparatus as claimed in claim 17 further comprising a stationary means having an annular working surface confronting and spaced from the working surface of said rotor, said means for feeding the liquid component and means for feeding the solid or pasty component directing said components through the center of said annular stationary working surface towards the axis of said rotating working surface.

23. Apparatus as claimed in claim 22 wherein the rotating working surface is in the form of a truncated cone and the stationary working surface has a corresponding conical configuration.

24. Apparatus as claimed in claim 23 wherein the truncated cone surface of said rotor and the stationary conical working surface include coaxial annular embossed rings between which said dispersion or solution passes generally radially during mixing.

25. Apparatus as claimed in claim 24 wherein the annular embossed rings of the said rotor and the annular embossed rings of the stationary working surface extend alternately between each other whereby said dispersion or solution passes along a tortuous path.

* * * * *